2 Sheets--Sheet 1.

H. W. YERINGTON.
Wire Fastening for Bottle-Stoppers.

No. 162,451. Patented April 20, 1875.

WITNESSES:
A. W. Almquist
C. Sedgwick

INVENTOR:
H. W. Yerington
BY Munn & Co.
ATTORNEYS.

THE GRAPHIC CO.PHOTO-LITH.39.& 41 PARK PLACE,N.Y.

H. W. YERINGTON.
Wire Fastening for Bottle-Stoppers.

No. 162,451.   Patented April 20, 1875.

WITNESSES:
A. W. Almqvist
C. Sedgwick

INVENTOR:
H. W. Yerington
BY
ATTORNEYS.

UNITED STATES PATENT OFFICE.

HENRY W. YERINGTON, OF OCEANIC, NEW JERSEY, ASSIGNOR TO ROWLAND C. ANTHONY, OF NEW YORK CITY.

IMPROVEMENT IN WIRE-FASTENINGS FOR BOTTLE-STOPPERS.

Specification forming part of Letters Patent No. 162,451, dated April 20, 1875; application filed August 1, 1874.

*To all whom it may concern:*

Figure 1:
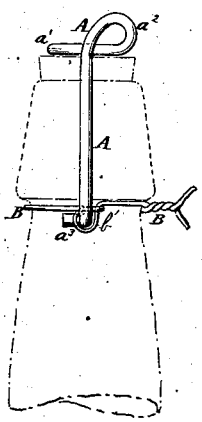
Figure 2:
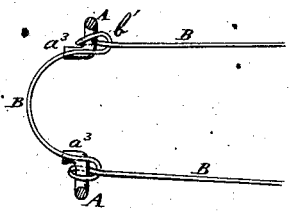
Figure 3:
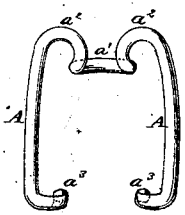
Figure 4:
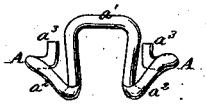
Figure 5:
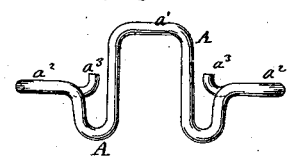
Figure 9:
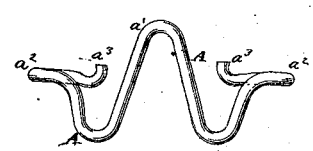
Figure 6:
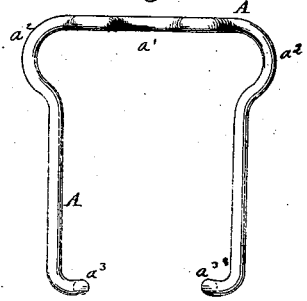
Figure 10:
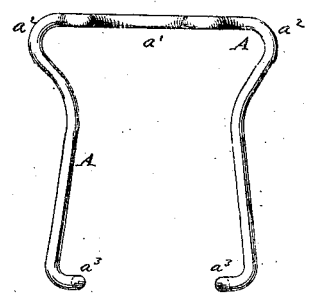
Figure 7:
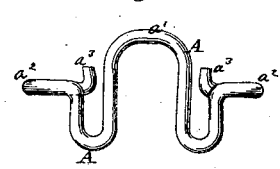
Figure 11:
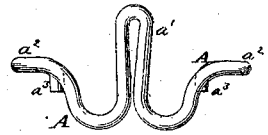
Figure 8:
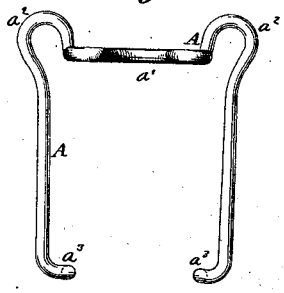
Figure 12:
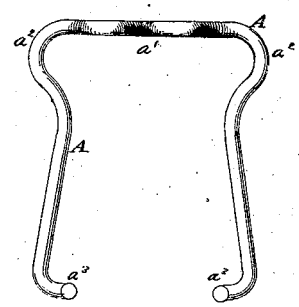

Be it known that I, HENRY W. YERINGTON, of Oceanic, in the county of Monmouth and State of New Jersey, have invented a new and useful Improvement in Wire-Fastenings for Bottle-Stoppers, of which the following is a specification:

Figure 1, Sheet 1, is a side view of my improved fastening. Fig. 2, Sheet 1, is a horizontal section of the same. Fig. 3, Sheet 1, is a front view of the bail-wire. Fig. 4, Sheet 1, is a top view of the same. Fig. 5, Sheet 2, is a top view, showing a modified form of the lugs. Fig. 6, Sheet 2, is a front view of the same. Fig. 7, Sheet 2, is a top view, showing another modified form of the same. Fig. 8, Sheet 2, is a front view of the same. Fig. 9, Sheet 2, is a top view, showing a modified form of the center loop. Fig. 10, Sheet 2, is a front view of the same. Fig. 11, Sheet 2, is a top view, showing another modified form of the center loop. Fig. 12, Sheet 2, is a front view of the same.

Similar letters of reference indicate corresponding parts.

My invention has for its object to furnish improved wire-fastenings for bottle-stoppers, which shall be so constructed as to prevent the fastenings from passing off at the front of the bottles, and thus insure their being in proper position when the bottle is passed into the bottling-machine, which shall be so constructed as to enable the fastening to be readily placed upon and withdrawn from the stopper, and to enable the center loop of the fastening to be passed through a slot in the plunger of the bottling-machine, so that the fastening can be adjusted in place before said plunger be withdrawn.

The invention will first be fully described, and then pointed out in the claim.

A represents the bail-wire, upon the middle part of which is formed a loop, $a^1$, to rest upon the top of the cork or stopper of the bottle. The loop $a^1$ may be made U-shaped, as shown in Figs. 4, 5, and 7; V-shaped, as shown in Fig. 9; or with its arms pressed close together, as shown in Fig. 11. The latter construction enables it to be passed through a slot in the plunger of a bottling-machine, so that the fastening may be adjusted in place upon the stopper before said plunger be withdrawn.

Upon the wire A, at the ends of the loop $a^1$, are formed lugs or finger-loops $a^2$, by bending the wires A upward, rearward, outward, and downward, as shown in Figs. 1, 3, and 4; or by bending them outward, rearward, outward, downward, inward and downward, as shown in Figs. 5 and 6; or by bending them outward, rearward, upward, outward, downward, inward, and downward, as shown in Figs. 7 and 8, it being immaterial in what particular manner the said wires are bent, so long as lugs or loops $a^2$ are formed, standing out from the stopper, so as to be readily taken hold of with the fingers.

From the finger-loops $a^2$ the arms of the bail-wire A pass down vertically to the neck-wire B, where they are bent inward at right angles, and are then bent to the rearward at right angles, as shown at $a^2$ in Figs. 1, 2, 3, and 4.

B is the neck-wire, the middle part of which passes around the rear side of the neck of the bottle.

The arms of the wire B pass along the sides of the bottle-neck above the bent ends $a^3$ of the bail-wire A, and are then bent outward and rearward, are passed down around the ends $a^3$ of the bail A, are passed up through the bends of the said wire B, are bent forward, and are twisted together at the front of the bottle's neck.

By this construction of the loops $b'$, the rearwardly-projecting ends $a^3$ of the bail-wire A project beneath the body or bow of the neck-wire B, and serve as stops to prevent the bail-wire from being turned down forward, and thus insure its being always upon the proper side of the bottle when the bottle is placed in the bottling-machine.

Having thus described my invention, I claim as new and desire to secure by Letters Patent—

In combination with the loops $b'$, made on the under side of the neck-wire, the bends $a^3$ on the arms of the bail-wire, so that while the bail is free to swing in one direction the bent ends coming against the neck-wire prevents it from swinging in the other and wrong direction in relation to the plunger, substantially as described and represented.

HENRY W. YERINGTON.

Witnesses:
JAMES T. GRAHAM,
T. B. MOSHER.